United States Patent [19]

Gaeddert et al.

[11] 4,182,101
[45] Jan. 8, 1980

[54] MACHINE FOR COILING FIBROUS CROP MATERIALS INTO LARGE ROUND BALES

[75] Inventors: Melvin V. Gaeddert, Newton; Bobby D. McWhirt, Hesston, both of Kans.

[73] Assignee: Hesston Corporation, Hesston, Kans.

[21] Appl. No.: 856,416

[22] Filed: Dec. 1, 1977

[51] Int. Cl.² ............................................. A01D 39/00
[52] U.S. Cl. ........................................ 56/341; 100/88
[58] Field of Search ........... 56/341, 343, 344, DIG. 1; 198/782; 100/88

[56] References Cited

U.S. PATENT DOCUMENTS

| | | | |
|---|---|---|---|
| 3,022,622 | 2/1962 | Nolt | 56/341 |
| 3,837,159 | 9/1974 | Vermeer | 56/341 |
| 3,901,007 | 8/1975 | Blanshine et al. | 56/341 |
| 3,964,246 | 6/1976 | Kopaska | 56/341 |
| 3,968,632 | 7/1976 | Gaeddert et al. | 56/341 |
| 3,979,892 | 9/1976 | Kucern | 56/341 |
| 3,992,987 | 11/1976 | Sereg | 56/341 |
| 4,008,800 | 2/1977 | Forsyth | 198/782 |
| 4,016,712 | 4/1977 | Gaeddert et al. | 56/341 |
| 4,092,914 | 6/1978 | Burrough et al. | 56/341 |

FOREIGN PATENT DOCUMENTS

| | | | |
|---|---|---|---|
| 278234 | 10/1966 | Australia | 100/88 |
| 178595 | 1/1964 | U.S.S.R. | 56/341 |

*Primary Examiner*—Russell R. Kinsey
*Assistant Examiner*—Paul J. Hirsch
*Attorney, Agent, or Firm*—Schmidt, Johnson, Hovey & Williams

[57] ABSTRACT

The machine employs a vertically oriented bale-starting chamber and a crop pickup located immediately below such chamber so that materials lifted from the ground by the pickup as the machine advances are fed directly up into the starting chamber to be acted upon by front and rear sets of oppositely moving, vertically disposed belts. A throat area at the bottom of the starting chamber and above the pickup is devoid of compression rollers and other like structure that would squeeze and compress the upwardly fed materials into a mat so that unencumbered free flow of materials up into the starting chamber is assured. A special bale-positioning roll adjacent the bottom of the chamber keeps the bale from riding against belts wrapped around a forward roll so that materials are not wedged in a pinch point where the belts contact the forward roller, and special projections on the forward roller clean out the area just above the latter so as to avoid the accumulation of trash material therein. Specially mounted bearings on the exterior of the sidewalls of the machine prevent wrapping of crop material at the ends of the rolls and premature bearing failure.

15 Claims, 9 Drawing Figures

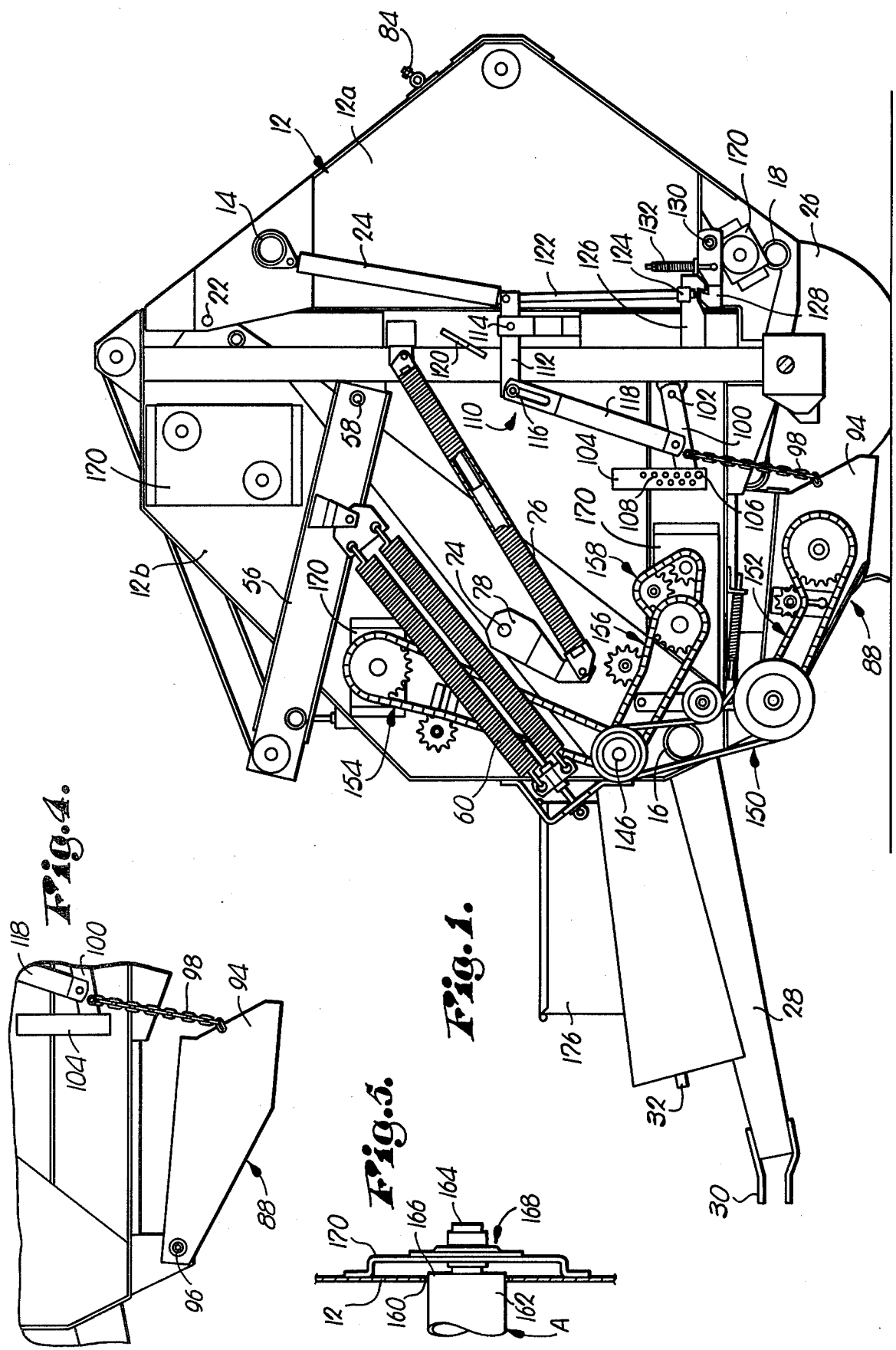

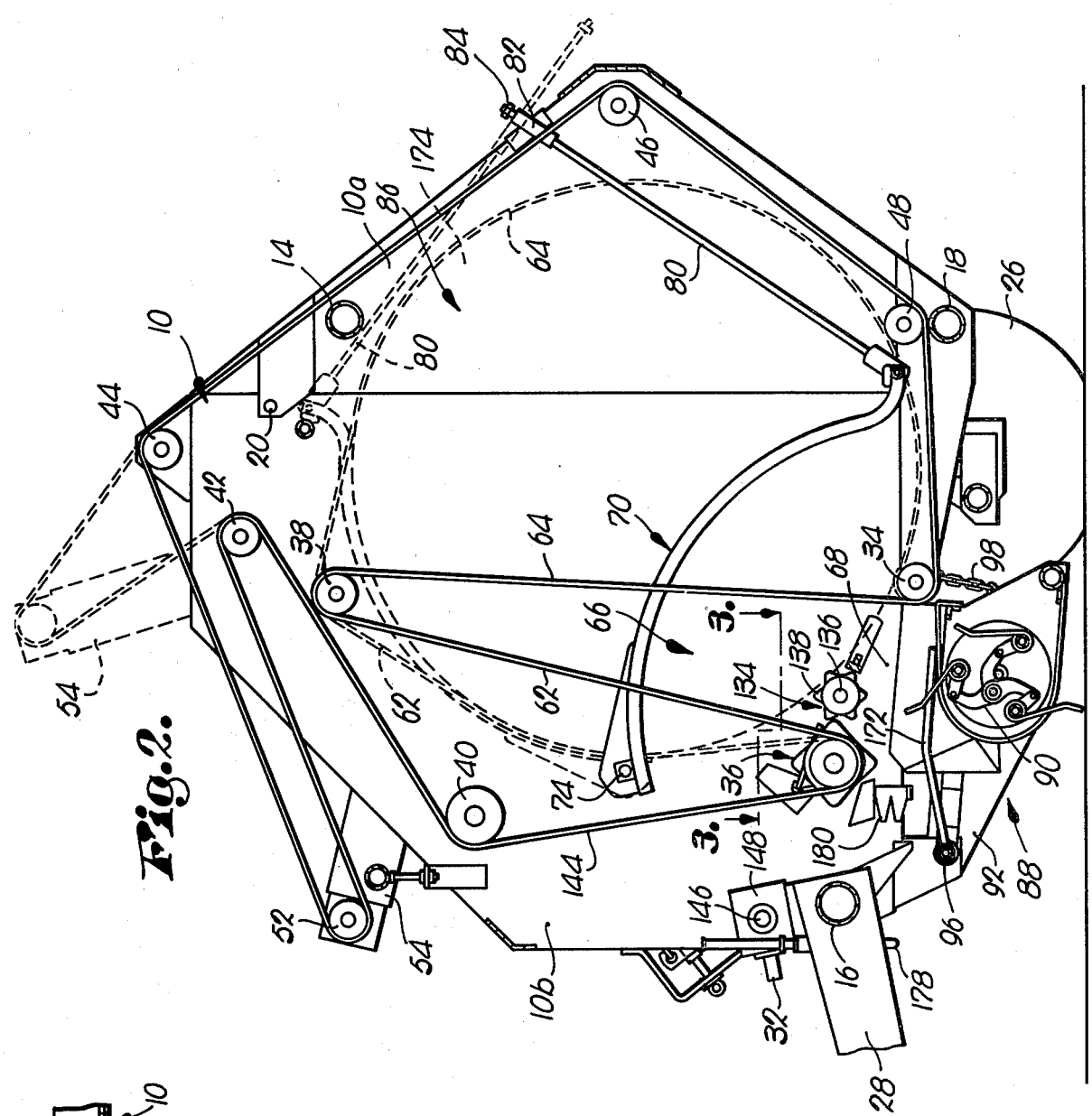
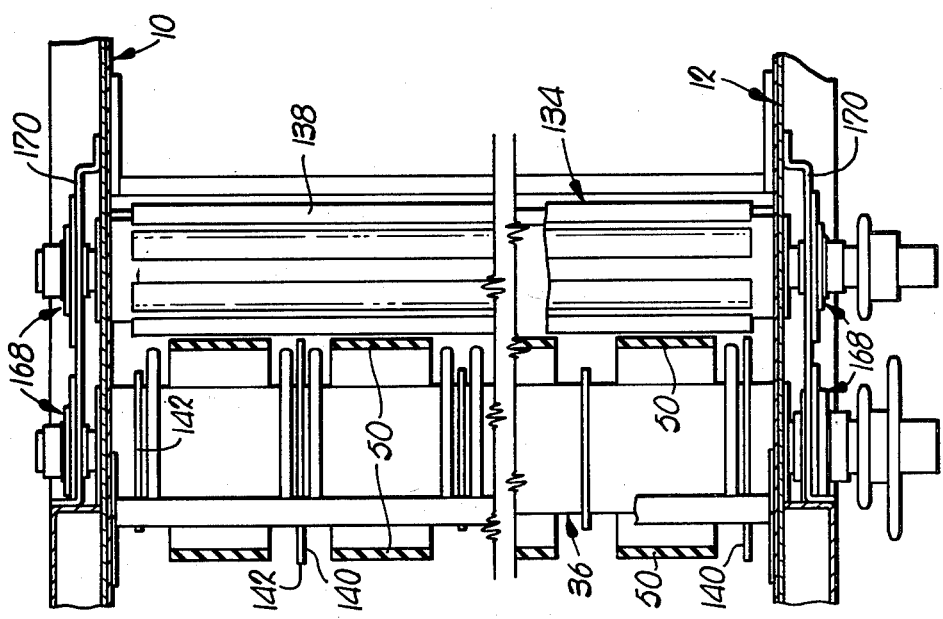

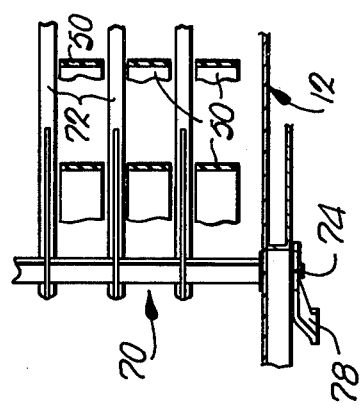
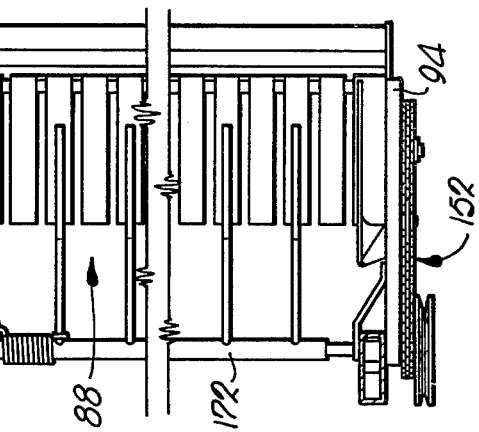
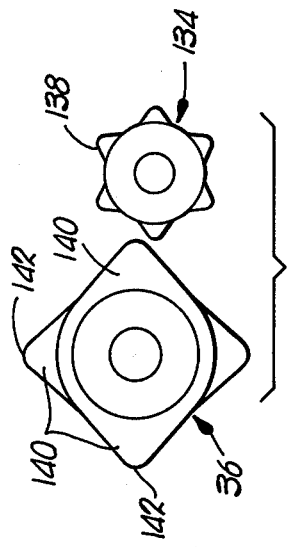
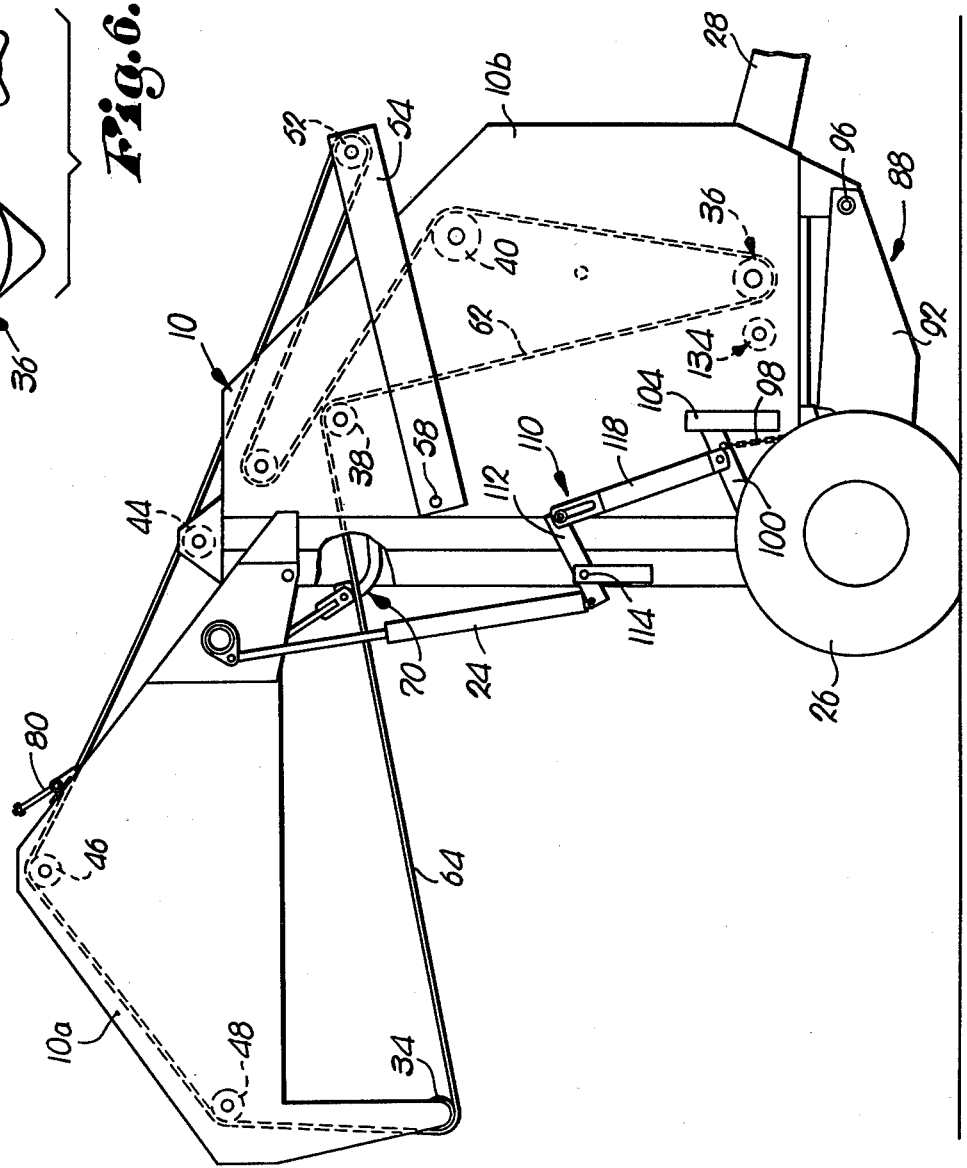

MACHINE FOR COILING FIBROUS CROP MATERIALS INTO LARGE ROUND BALES

This invention relates to balers used to produce large "round" bales on the order of 1,500 to 2,000 pounds, and, in many respects, represents an improvement over the concepts described and claimed in pending application, Ser. No. 584,870, filed June 9, 1975, and titled "Method and Apparatus for Making Large Round Crop Bales," in the name of Holdeman, et al, and assigned to the assignee of the present invention. Said prior application relates to a "pop-up" baler in which crop material is initially rolled along the ground until the core thus formed reaches a certain predetermined diameter, whereupon it "pops up" between and rests upon a pair of rollers that thereafter support the bale as it continues to grow within an off-the-ground chamber.

The machine in said application utilizes what could be termed a vertically oriented baling chamber in which opposed upright and oppositely moving belt runs work against the periphery of the bale to compact the same and roll it into an ever-enlarging bale. However, as just stated, starting of the bale in its tumbling action is accomplished on the ground so that, in essence, the starting chamber is between the ground on the one hand and the overhead baling chamber on the other hand.

In many respects, also, the present invention represents an improvement over many balers presently on the market which utilize more of a horizontally disposed starting chamber, wherein the picked-up crop is subjected to overhead, forwardly moving belt runs and underlying rearwardly moving rollers or belts to induce rolling. As the bale core picks up additional material and grows in diameter, it flexes the overhead belts up into a much larger available chamber beyond a pair of overhead rollers, and after reaching a predetermined size, that core passes up between such rollers and remains in a supported position above the same throughout the rest of the baling cycle.

This latter type of machine presents a number of problems in start-up, many of which can be attributed to the fact that the bale core is started in a small chamber below the main baling chamber, and the core must overcome the considerable resistance of the overhead belt runs before it can leave the starting chamber and grow in the main baling chamber. Moreover, machines of this type typically are provided with a pair of cooperating compression rollers located just rearwardly of the crop pickup unit that squeeze the stream of crop material issuing from the pickup into a relatively flat mat and then force-feed the mat into the starting chamber to begin the baling process. Such compression rolls thus present a severely restricted throat that can become easily clogged and which limits the volume and characteristics of crop materials that can be handled by the baler.

With these thoughts in mind, then, it is one important object of the present invention to provide a baler which incorporates the vertical chamber concepts of the aforesaid application so as to gain the benefit of its many attributes, but which also improves upon such concepts by utilizing the same in a totally off-the-ground, baleforming process through the addition of a separate pickup assembly immediately below the open lower end of the vertical chamber in position to lift material off the ground and feed the same directly up into such chamber. Thus, as compared to the machine of said prior application, there is no rolling of the bale on the ground at all in the present invention, the start-up and subsequent formative steps being carried out totally off the ground. And, as compared to the other typical prior machines above-mentioned, the starting chamber in the present invention is located above the pair of the usual lower belt rollers with access to such starting chamber by incoming crop being totally unhindered and unrestricted by overhead belt runs and the like across the two rollers.

Another important object of this invention is to obtain the benefits of using a conventional windrow-type pickup on the baler, but without the disadvantages heretofore typically present in conventional machines in connection with compression rollers utilized behind such windrow pickups that serve to restrict and clog the throat leading to the bale chamber. Stated differently, it is an important object of the invention to incorporate open throat concepts into an off-the-ground baler without sacrificing bale density.

A further important object of this invention is to provide a way of floatingly mounting the pickup below the chamber in such a way that it is pulled by the baler across the field instead of pushed thereby as in present typical balers.

Additionally, it is an important object of the invention to eliminate or substantially reduce the tendency for crop material to become wedged into pinch points between certain of the rolls of the machine and the belts associated therewith so as to assure proper operation of the belts during bale formation, and to alleviate the frustrating and time-consuming task of manually removing the jammed crop material.

Still further, it is an important object of this invention to eliminate the problems heretofore incident to having bearings for the various rolls of the baler mounted "internally" of the machine in positions which subject the bearings to premature failure as a result of the destruction of bearing seals by the wrapping and abrading action of crop material.

A still further important object of the present invention is to improve upon the teachings of prior U.S. application, Ser. No. 704,173, filed July 12, 1976, titled "Machine For Rolling Crops Into Round Bales," in the name of Arnold F. Kopaska, and licensed to the assignee of the present invention.

In the drawings:

FIG. 1 is a left-side, elevational view of a baler constructed in accordance with the principles of the present invention;

FIG. 2 is a fragmentary, vertical cross-sectional view thereof taken just inboard of the left sidewall of the machine, the solid line positions of various components being indicative of the situation at bale-starting, while the phantom line positions thereof indicating the conditions of things at the achievement of full bale size;

FIG. 3 is an enlarged, fragmentary cross-sectional view through the front portion of the baler taken substantially along line 3—3 of FIG. 2;

FIG. 4 is a fragmentary detail view illustrating the manner in which the crop pickup is mounted for pulling thereof by the baler;

FIG. 5 is an enlarged, fragmentary detail view of a typical bearing mounting arrangement for certain of the rolls of the machine;

FIG. 6 is an enlarged end elevational view of the special configuration of two rolls at the lower front end of the chamber that prevent the significant accumulation of crop material in unwanted areas between belts and the main forward roll;

FIG. 7 is a fragmentary, horizontal cross-sectional view through the baler just above the grid thereof to illustrate the way in which the belts are interspersed among elements of the grid;

FIG. 8 is a fragmentary, top plan view of the pickup portion of the machine; and FIG. 9 is a right-side, elevational view of the machine showing the rear half thereof opened for bale discharge.

The baler has a pair of laterally spaced sidewalls 10 and 12 that are separated by various transverse structural members, such as 14, 16 and 18, the sidewall 10 having a rear portion 10a swingably attached to front portion 10b by a pivot 20. Likewise, the sidewall 12 has a rear portion 12a swingably attached to a front portion 12b by a pivot 22 so that, in effect, the rear portions 10a and 12a cooperate to form a rear gate for the baler that may be raised to the discharge position of FIG. 9 by hydraulic cylinder assemblies 24.

The sidewalls 10 and 12 are supported by a pair of ground-engaging wheels 26 (only one being shown in the drawings) for travel across a field, and are also provided with a forwardly extending tongue 28 having a coupling 30 at its forwardmost end for hitching the baler to a suitable towing vehicle. The power takeoff shaft of the vehicle (not shown) may be connected with a fore-and-aft extending drive shaft 32 above the tongue 28 for supplying driving power to the various components of the baler in need of such power.

A plurality of transversely extending rolls span the sidewalls 10 and 12, including a pair of lower rolls 34 and 36 that are spaced apart in a fore-and-aft direction generally in the forward half of the baler. Other transverse rolls include the roll 38 spaced above and somewhat between the two lower rolls 34, 36, the roll 40 spaced above and somewhat forwardly of the roll 36, the roll 42 spaced above and somewhat rearwardly of the roll 38, the roll 44 spaced above and somewhat rearwardly of roll 42, the rear roll 46 spaced substantially below and substantially rearwardly of the roll 44, and a lower rear roll 48 spaced forwardly of rearmost roll 46 and at approximately the same level as the roll 34. A single endless, foraminous web in the nature of a series of side-by-side belts 50 (see FIG. 7) are trained about the rolls 36–48 in the manner illustrated in FIG. 2, and also about an additional tensioning roll 52 extending between a pair of arms 54 and 56 that are swingably attached to the respective sidewalls 10 and 12 about aligned pivots 58. Tension springs 60 yieldably bias the arms 54 and 56 downwardly to their normal positions illustrated in solid lines in FIGS. 1 and 2, but allow the same to swing upwardly to the phantom line position in FIG. 2.

This arrangement of the belts 50 provides for the definition of a bale-starting chamber between the sidewalls 10 and 12 and fore-and-aft stretches 62 and 64 of the belts 50, as illustrated plainly in FIG. 2, such starting chamber being designated by the numeral 66. Inasmuch as the stretches 62 and 64 are essentially upright, the starting chamber 66 is rendered vertically oriented, having an open bottom or throat 68 defined between the rolls 34 and 36, and a top that is defined by an arcuate grid 70 spaced above the rolls 34, 36 and spanning the stretches 62, 64. The grid 70 includes a series of elongated, laterally spaced-apart elements 72 (FIG. 7) that are interspersed between adjacent belts 50 of the stretches 62, 64, the grid 70 extending entirely across the chamber 66. The forward end of the grid 70 is secured to a transverse pivot 74 spanning the sidewalls 10, 12 so as to adapt the grid 70 for vertical swinging movement between the solid line position of FIG. 2 and the raised phantom position thereof, such swinging being yieldably resisted by a spring assembly 76 on the outside of sidewall 12 that is coupled with a crank 78 operably connected to the grid 70. At the rear of the grid 70 a limit rod 80 on each side of the machine is pivotally connected at its lower end to the grid 70 and is telescopically received at its upper end to a pivotally mounted tube 82 secured to the rear sidewalls 10a, 12a. A nut 84 on the outermost end of each of the rods 80 limits the extent of downward travel of the rods 80 through the tubes 82 and thereby establishes the lower limit of swinging movement of the grid 70.

Swinging of the tension arms 54, 56 to the phantom position of FIG. 2 releases stored slack in the belts 50 so that the web stretches 62, 64 can be deflected laterally to their phantom line positions of FIG. 2 corresponding to a position of maximum bale growth and also defining the limits of what may be termed a larger baling chamber 86 that has evolved from the small starting chamber 66. Note that the overhead roll 38 remains in a fixed position during such enlargement, and this is significant from the standpoint of relieving the material within the starting chamber 66 of any overhead force from belts and the like that it must overcome in order to enter the starting chamber 66 and begin rolling, as will hereinafter be explained. Note that the grid 70 serves as a limit to the upward travel of materials within the starting chamber 66, the belts 50 normally being driven in such a direction that the front web stretch 62 is moving downwardly as illustrated in FIG. 2, while the rear web stretch 64 is moving upwardly.

Suspended immediately below the starting chamber 66 and substantially between the rear roll 34 and the front roll 36 is a crop pickup 88 that serves to lift materials off the ground and deliver the same directly upwardly into the starting chamber 66 through the throat 68, the latter having its lower limits defined by the pickup 88. The pickup 88 is not per se new, utilizing the usual retracting tine mechanism 90 (FIG. 2), but such mechanism 90 is mounted in a special way. In this regard, a pair of arms 92 and 94 on opposite sides of the mechanism 90 extend forwardly therefrom for swinging attachment to the frame of the machine by pivots 96, thereby adapting the pickup 88 for vertical swinging movement about a transverse horizontal axis defined by the pivots 96. (Reference to FIG. 4 might be helpful.) A pair of limit chains 98 on opposite sides of the pickup 88 at the rear thereof extend upwardly and are connected to straps 100 having a pivotal connection 102 with a corresponding sidewall 10 or 12. The straps 100 may be selectively placed in any one of a number of swingable vertical positions about the pivots 102 by virtue of adjusting plates 104 having a series of holes therein for the reception of a limit bolt 106 that serves as a seat for the forward end of the swingable strap 100. Manifestly, the particular hole 108 chosen for insertion of the bolt 106 determines the vertical position of the strap 100 about its pivot 102, and thence also the vertical position of the rear of the pickup 88 via the limit chains 98.

While determination of the height for the working position of the pickup 88 is determined by which of the holes 108 is selected for the limit bolt 106, swinging of the pickup 88 between its lower working position of FIGS. 1, 2 and its upper roading position of FIG. 9 is controlled by the hydraulic cylinders 24 through linkage 110 coupled with the straps 100. Linkage 110 on each side of the machine includes a fore-and-aft extending lever 112 swingable vertically about a fulcrum 114 and connected at its rear end with the cylinder 24. The front end of the lever 112 makes a pin-and-slot connection 116 with a diagonally extending link 118 connected at its lower end to the strap 100. Each of the levers 112 is provided with an overhead limit stop 120 engageable with the lever 112 after a predetermined amount of clockwise swinging thereof viewing FIG. 1.

The rear end of each lever 112, in addition to being connected to its corresponding cylinder 24, is also pivotally coupled with a downwardly extending push rod 122 that is telescopically received at its lower end by a collar 124 fixed to a rearwardly extending catch 126. The lower terminal end of each rod 122 is disposed by the collar 124 in operating position above the forward end of a swingable latch 128 mounted on the corresponding rear sidewall portion 10a or 12a by a pivot 130. A spring assembly 132 yieldably biases each latch 128 up into engagement with its cooperating catch 126.

As illustrated best in FIGS. 2, 3 and 6, the bale-starting chamber 66 is provided with bale-positioning means in the nature of a roll component 134 spanning the machine between the sidewalls 10, 12 and mounted for rotation about a transverse, horizontal axis 136. The positioning roll 134 extends parallel to the forward roll 36 a short distance behind the latter and at approximately the same vertical level. The periphery of the roll 134 is undulated all along the length thereof, such configuration being achieved by the attachment of a plurality of angle members 138 thereto.

The forward roll 36 has sets of diametrically opposed projections 140 thereon with adjacent sets being spaced apart axially of the roll 36 and so located that they extend between adjacent ones of the belts 50 looped beneath the roll 36. Adjacent sets of the projections 140 are ninety degrees (90°) out of phase with one another so as to present the "four-pronged" configuration when viewed in end elevation as in FIG. 6. Note that each of the projections 140 tapers outwardly to an apex 142 and that such apices project between adjacent ones of the belts 50 along the web stretch 62, and also along another web stretch 144 leading upwardly from the roll 36 at the front of the machine.

As shown in FIG. 2, the fore-and-aft drive shaft 32 above the tongue 28 makes a right-angle connection with a transverse drive shaft 146 within a gearbox 148 at the rear of the tongue 28. As shown in FIG. 1, the transverse shaft 146 extends outwardly beyond the left sidewall 12 and distributes driving power to the pickup 88, the belts 50, and the bale-positioning roll 134 at that point. With respect to the pickup 88, a belt and pulley assembly 150, and thence a chain and sprocket assembly 152, brings the rotating motion of the drive shaft 146 to the retracting tine mechanism 90. With respect to the belt 50, an upwardly and diagonally extending chain and sprocket assembly 154 transmits the rotative motion of the shaft 146 to the roll 140 so as to drive the latter in a clockwise direction viewing FIG. 2. With respect to the bale-positioning roll 134 and the front roll 36, a chain and sprocket assembly 156 leading downwardly and rearwardly from the shaft 146 is connected first with the roll 36, from whence another chain and sprocket assembly 158 leads rearwardly to the positioning roll 134 so as to drive the latter in the same direction (clockwise) as the roll 36.

At least certain of the belt rolls 34-48 are mounted in a special way exemplified typically by the illustration of FIG. 5, and also as further illustrated in FIG. 3. In this regard, using the arrangement of FIG. 5 as an example, the wall 12 has an opening 160 therein that is slightly larger than the proximal portion 162 of the roll hereinafter referred to in this illustration as the roll A. The proximal portion 162 projects through the opening 160 to the outside of the sidewall 12 where it then takes the form of an extended shaft portion 164, the intersection between the proximal portion and the extended portion 164 creating a shoulder 166 that is located outwardly of the opening 160. A bearing 168 spaced outwardly from the sidewall 12 by its mount 170 rotatably receives the extended portion 164 and thereby journals the roll A, in cooperation, of course, with a similar bearing at the opposite end of the roll A, for rotation about the longitudinal axis of the roll A.

OPERATION

With the baler in the condition of FIGS. 1 and 2, the pickup 88 is ready to lift crop material from the field upon advancement of the baler across the latter. As such operation is begun, the web stretches 62 and 64 move in opposite generally vertical directions as illustrated in FIG. 2 so that material lifted by the pickup 88 and fed directly up into the starting chamber 66 is lifted at the rear by the stretch 64 and pulled downwardly at the front by the stretch 62, thereby inducing a rolling action within the starting chamber 66. The overlying rigid grid 70 contributes to this action, particularly in view of its downturned, arcuate configuration, and also serves to assist in the even distribution of material entirely across the width of the machine within the chamber 66. Such even distribution is also enhanced by the action of gravity which is allowed to come into play in view of the vertical orientation of the starting chamber, as opposed to a horizontal disposition thereof as in conventional machines.

As the crop is engaged by the retracting tine mechanism 90 and lifted upwardly, it is retained slightly by a downwardly biased wind guard 172 of conventional construction, but beyond the slight retentive force by the wind guard 172, there is no other restrictive or compactive force applied to the flow of crop material upwardly through the throat 68 and into the starting chamber 66. Note in this regard that the upwardly flowing crop material need not overcome any kind of overhead resistance from belts or otherwise in order to pass upwardly between the rolls 34, 36 and enter the starting chamber 66.

As the machine continues to advance and additional material is fed upwardly into starting chamber 66 by the pickup 88, the rolling bale presses laterally against the stretches 62, 64 and upwardly against the grid 70, whereby these boundaries for the chamber 66 begin to retreat toward their phantom positions of FIG. 2, by which time, of course, the small starting chamber 66 has evolved into a much larger baling chamber 86 conforming in size and shape to that of the finished bale denoted by the numeral 174. Once the bale 174 has achieved this size, advancement of the machine may stop while operation of the belts 50 continues so as to spin the bale 174 within the chamber 86 for wrapping with twine supplied from a box 176 above the tongue 28 and distributed by suitable twine tube mechanism 178, as shown in FIG. 2. A cutting device 180 of suitable design may be employed to sever the twine once the bale has been wrapped several times helically by the twine.

Once thusly tied, the bale is in condition to be ejected from the machine, and this is achieved by actuating the cylinders 24 to extend the same. The first effect of such extension of the cylinders 24 is to rock the levers 112 clockwise viewing FIG. 1 so that the pickup 88 is raised to the position of FIG. 9 via links 118, straps 100 and chains 98, while also the push rods 122 are pushing downwardly against the latches 128 to swing the latter about their pivots 130, and thus disengage the same from the catches 126. When the levers 112 swing upwardly against the limit stops 120, further extension of the cylinders 24 results in raising the rear half of the machine defined by the rear sidewall portions 10a and 12a, as illustrated in FIG. 9, so that the bale may then fall freely to the ground. Retraction of the cylinders 24 institutes a reversal of the foregoing so that, once the rear of the machine is again closed against a front portion thereof, the pickup 88 is again in its lowered operating position in readiness to resume the baling procedure.

It has been found that the vertical orientation of the starting chamber 66 and the positioning of the same above the lower rolls 34 and 36 is very significant insofar as reliable starting of bale formation is concerned. In many prior machines, a bale-starting chamber was located below a pair of belt rolls, such as the rolls 34 and 36 of the present machine, there being a stretch of belts spanning the distance between such two rolls and essentially closing off the vast area in the baler above the lower rolls. Thus, in order to start rolling into a bale, the crop material had to overcome the oppressive force from the overhead belts and then flex the same sufficiently far upwardly into the overhead chamber as to permit the rolling core to migrate up into that area and carry out its further growth above the two rolls.

As contrasted to that arrangement, note herein that bale formation, from start to finish, is carried out totally above the two rolls 34 and 36, and that therefore both the starting chamber 66 and the larger baling chamber 86 occupy portions of the same area above the rolls 34 and 36. This means that incoming crop material is started out in the same area that it will finish up, i.e., above the two rolls 34, 36, so that no risks of failure during transfer from a starting chamber below to a baling chamber above are incurred.

Importantly, also, is the fact that the throat 68 is devoid of compression rollers and the like so that a wide open pathway to the starting chamber 66 is presented.

The bale-positioning roll 134 serves an important function throughout the operation, although it does not contribute directly to bale formation. Its job is to keep the lower periphery of the bale, such as the bale 174 in FIG. 2, away from the roll 36. Without positioning roll 134, the bale tends to sit on the roll 36 and squeeze the front web stretch 62 tightly against the roll 36, so much so that crop materials passing between the belts 50 from chambers 66 and 86 can become wedged down into the pinch point between the stretch 62 and the roll 36. By keeping the weight of the bale off the front roll 36, however, this pinch point is avoided to the end that, although materials may still flow forwardly between the belts 50 into that generally V-shaped area directly above the roll 36 and bounded by the stretches 62 and 144, such material does not become tightly wedged down between the web stretch 64 and the front roll 36.

Any material that does enter into the V-shaped area above the roll 36 is acted upon by the many projections 140 spinning around with the roll 36 so that such material is constantly being kicked back out of the area. Hence, accumulation of material above the roll 36 is largely avoided, to the end that clogging and jamming problems are minimized.

The special way in which the various bearings for the rolls on this machine are mounted is of significant importance. In prior arrangements where such bearings were located inboard of the sidewalls, steps had to be taken to shield the bearings from crop material that would tend to wrap around the ends of the rolls and abrade against the vulnerable seals associated with such bearings. However, in many ways, this simply made matters worse because it introduced structure that tended to abrade the ends of the bales and flake off additional loose material to find its way to the bearings. Moreover, it produced a ragged, aesthetically unsatisfactory appearance to the end of the bales.

Thus, prior arrangements not only invited premature bearing failure, but also detracted from the quality of bales capable of being produced. In the present invention, however, this is avoided because bearings for the rolls are mounted outside of the sidewalls 10, 12 in positions where they cannot be reached by the rolling bale. Moreover, there is little likelihood that wrapping will be a problem at the opposite ends of the rolls because, as illustrated in FIG. 5, the large main portion 162 of each roll extends entirely through the corresponding sidewall through a position outwardly beyond the latter before it reduces down to the extended shaft portion 164. Hence, the shoulder 166 between such two portions 162, 164, where wrapping might otherwise occur, is safely disposed outside of the area which can be reached by the rolling bale.

It should also be pointed out that by mounting the pickup 88 in such a way that it is pulled by the baler instead of being pushed thereby, a much smaller likelihood of damage to the pickup is obtained. Prior arrangements risked "stubbing" the pushed pickup on rises in the terrain, such unfortunate occurrences causing considerable damage to the pickup and necessitating replacement and repair, as well as significant lost harvesting time.

Having thus described the invention, what is claimed as new and desired to be secured by Letters Patent is:

1. In a machine for rolling crop materials into cylindrical bales, wherein said rolling takes place entirely off the ground, the improvement comprising:

a vertically disposed, expandable chamber having a pair of initially generally vertically disposed web stretches defining opposed portions of the chamber and disposed to deflect laterally as the bale grows in size whereby to enlarge the chamber, said stretches being drivable in opposite linear directions so as to impart a rolling action to material contained within the chamber;

means across the top of said chamber and spanning said stretches for limiting the upward movement of materials being acted upon in the chamber;

a pair of guide members adjacent the lower end of said chamber and spaced apart in a fore-and-aft direction relative to the path of travel of the machine, said stretches being trained around respective ones of said members; and a crop pickup mounted below said members and between the same in a fore-and-aft direction for lifting crop materials off the ground and feeding the same directly up into said chamber in an upwardly flowing stream, said pickup and said members cooperating to define an open throat through which materials may flow freely into said chamber without substantial compaction or clogging, said stretches being linearly spaced portions of the same web.

2. In a machine as claimed in claim 1, wherein said web is provided with a third guide member located in a fixed position above said other pair of members, said web being looped over said third member to present said stretches.

3. In a machine as claimed in claim 1, wherein said web stretches each include a plurality of laterally spaced belts.

4. In a machine as claimed in claim 3, wherein said limiting means across the top of the chamber is yieldably movable away from a bale-starting position to a finished-bale position, and includes a grid having a series of elements interspersed between said belts.

5. In a machine for rolling crop materials into cylindrical bales, the improvement comprising:

means defining an off-the-ground, vertically oriented baling chamber within which crop materials may be rolled into a bale, said chamber being expandable as the bale grows within the chamber;

a pair of members located at the bottom of said chamber and spaced apart in a generally fore-and-aft direction relative to the normal path of travel of the machine to define an open, non-compressive entrance to the chamber through which new crop material may be introduced; and a crop pickup located forwardly adjacent the rear of said open entrance in disposition for lifting crop material off the ground as the machine advances and for feeding the lifted material up through the entrance into said chamber, the forwardly disposed member of said pair of members being spaced above said pickup so as to cooperate with the latter in defining a clear, unobstructed, open throat between the pickup and the forward member on the immediate upstream side of said open entrance with respect to the direction of crop material flow through the entrance.

6. In a machine as claimed in claim 5, wherein said means defining said chamber includes a pair of initially generally vertically disposed web stretches drivable in opposite linear directions and looped under said members, said web stretches being provided with overhead means supporting the same in their initially vertically disposed conditions.

7. In a machine as claimed in claim 5; and means defining a top to said chamer between said overhead means and said entrance that is yieldable upwardly during growth of the bale within the chamber.

8. In a machine as claimed in claim 5, wherein said pickup is provided with a pair of support arms extending forwardly therefrom and mounted at their forward ends for vertical swinging about a common horizontal axis, thereby adapting said pickup to be pulled across a field and disposed for vertical flotation.

9. In a machine as claim in claim 8, wherein said pickup is provided at the rear thereof with means suspending the same at a preselected vertical disposition.

10. In a rotary crop baling machine having rolls extending between opposite walls of the machine and supported for rotation about their respective longitudinal axes, said machine having a baling chamber in which loose crop materials are rolled into bales, and said rolls being disposed in the vicinity of said chamber, the improvement comprising:

a pair of clearance openings in said walls at opposite ends of a roll and slightly larger in diameter than the proximal portions of the roll, said proximal portions of the roll extending through corresponding said openings and terminating in extended portions projecting outwardly beyond said walls; and bearing means disposed outwardly of said walls and receiving said extended portions so as to journal the roll for said rotation.

11. In a rotary baling machine as claimed in claim 10, wherein each of said extended portions is smaller in diameter than its corresponding said proximal portion and intersects said proximal portion to form a shoulder, said shoulder being disposed outwardly of the corresponding wall.

12. In a rotary baling machine, wherein a rolling bale is formed off the ground generally above a transverse roll that has a foraminous web stretch looped below the same, said web stretch normally engaging the periphery of the bale during said rolling thereof and being driven in a direction that causes the stretch to move generally from the bale toward the roll, the improvement comprising:

bale-positioning means adjacent the side of the roll receiving the stretch from the bale and located in disposition to engage the lower periphery of the rolling bale and bear the weight thereof otherwise borne by said roll and said web stretch as it moves around said roll.

13. In a rotary baling machine as claimed in claim 12, wherein said bale-positioning means comprises a component extending across the machine in parallelism with said roll and mounted for rotation about its longitudinal axis.

14. In a rotary baling machine as claimed in claim 13; and means for rotating said component in the same direction as said roller.

15. In a rotary baling machine as claimed in claim 14, wherein said component is provided with an undulated periphery.

* * * * *